United States Patent [19]

Sekine

[11] 4,284,332
[45] Aug. 18, 1981

[54] SHUTTER MECHANISM FOR MOTION PICTURE CAMERAS

[75] Inventor: Jiro Sekine, Tokyo, Japan

[73] Assignee: Fuji Photo Film Co., Ltd., Minami-ashigara, Japan

[21] Appl. No.: 784,821

[22] Filed: Apr. 5, 1977

Related U.S. Application Data

[63] Continuation of Ser. No. 609,074, Aug. 29, 1975, abandoned.

[30] Foreign Application Priority Data

Sep. 3, 1974 [JP] Japan .................................. 49/101677

[51] Int. Cl.³ .............................................. G03B 9/10
[52] U.S. Cl. .................................... 352/208; 352/210; 352/220
[58] Field of Search ............... 352/208, 209, 216, 210, 352/220

[56] References Cited

U.S. PATENT DOCUMENTS

| 622,451 | 4/1899 | Dupue .................................. 352/208 |
| 3,186,003 | 5/1965 | Gregory et al. ..................... 352/208 |
| 3,531,194 | 9/1970 | Roppel et al. ....................... 352/216 |
| 3,602,585 | 8/1971 | Steibl et al. .......................... 352/208 |

Primary Examiner—Monroe H. Hayes

[57] ABSTRACT

A rotary shutter for a motion picture camera consists of two sector blades which are rotatable about the same shaft. The angular relative position of one sector blade to the other is fixed to have a fixed open angle thereby when a smaller open angle is desired. When a larger open angle is desired, one sector blade is fixed in the camera at a position to open an exposure aperture and only other blade is rotated. One sector blade is selectively engaged with the other sector blade or fixed in the camera by axial movement thereof.

7 Claims, 6 Drawing Figures

SHUTTER MECHANISM FOR MOTION PICTURE CAMERAS

This is a continuation of application Ser. No. 609,074 filed Aug. 29, 1975, now abandoned.

BACKGROUND OF THE INVENTION

1. Field of the Invention

This invention relates to a shutter mechanism for a motion picture camera, and more particularly to a rotary shutter for a motion picture camera the open angle of which can be changed.

2. Description of the Prior Art

In a rotary shutter comprising a rotatable sector which closes the aperture of the camera when the film is fed and opens the aperture when the film is stopped to expose the film to the light incident through the taking lens of the camera, the angle of the open portion of the sector determines the exposure time. The angle of the open portion of the sector (hereinafter referred to simply as "open angle") is usually about 160° in the conventional motion picture camera using a film of 8 mm wide. Recently, motion picture cameras having a rotary shutter which has an open angle of as large as 230° have been developed to enable taking a motion picture in the dark.

This kind of motion picture cameras having a rotary shutter of large open angle are advantageous in taking motion pictures in the dark, but are disadvantageous when used in the presence of large amount of light since it is difficult to accurately control the exposure with a small diaphragm. When the scene is bright, the aperture must be stopped down to a great extent to make a proper exposure of the film with the large open angle of the rotary shutter. The control of the exposure is very difficult when the aperture size is substantially small. In addition, if the open angle is very large, the shutter speed is very slow and accordingly the image is apt to be blurred.

It has also been known in the art to continuously vary the open angle of a rotatable shutter to effect a fade-in and fade-out operations. This type of rotatable shutter is, however, very complicated in structure and considerably expensive, accordingly.

SUMMARY OF THE INVENTION

It is the primary object of the present invention to provide a rotary shutter mechanism for a motion picture camera which is very simple in structure and the open angle of which is changeable by a simple operation.

It is another object of the present invention to provide a rotary shutter mechanism for a motion picture camera which is capable of effecting a very fast shutter speed when the scene is bright and accordingly the blur of image is prevented.

The rotary shutter in accordance with the present invention comprises two sector blades which are selectively engaged with each other to change the open angle formed thereby. When one sector blade is engaged with the other sector blade, an open angle is formed by the two sector blades which angle is smaller than the open angle of the sector blade itself. When one sector blade is disengaged from the other sector blade, the sector blade disengaged is fixed at a position to open the aperture of the camera and accordingly only the other sector blade is rotated to open and close the aperture with the larger open angle thereof to effect a longer exposure time.

DESCRIPTION OF THE PREFERRED EMBODIMENTS

Figure 1:
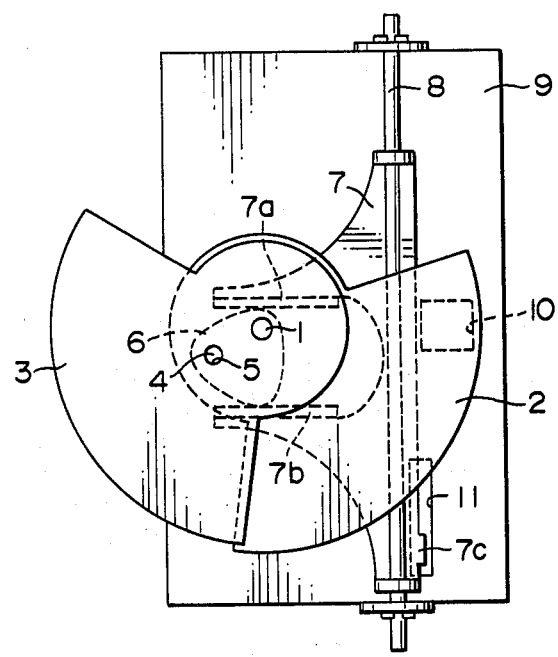
FIG. 1 is a front view of the shutter mechanism in accordance with a first embodiment of the present invention wherein the shutter blades form a smaller open angle.

FIGS. 1 to 4 show a first embodiment of the present invention wherein the reference numeral 1 indicates a shaft of a rotary shutter about which a first sector blade 2 and a second sector blade 3 are rotatably mounted. The first sector blade 2 is fixed to the shaft 1 and rotated by the revolution thereof. The second sector blade 3 is rotatably mounted on the shaft 1 and made slidable along the shaft 1 to be engaged with or separated from the first sector blade 2. The sector blades 2 and 3, particularly the first sector blade 2 has a wide open angle to expose the film for a long time to effect a slow shutter speed. The second sector blade 3 forms a smaller open angle together with the first sector blade 2 as shown in FIG. 1.

Figure 3:
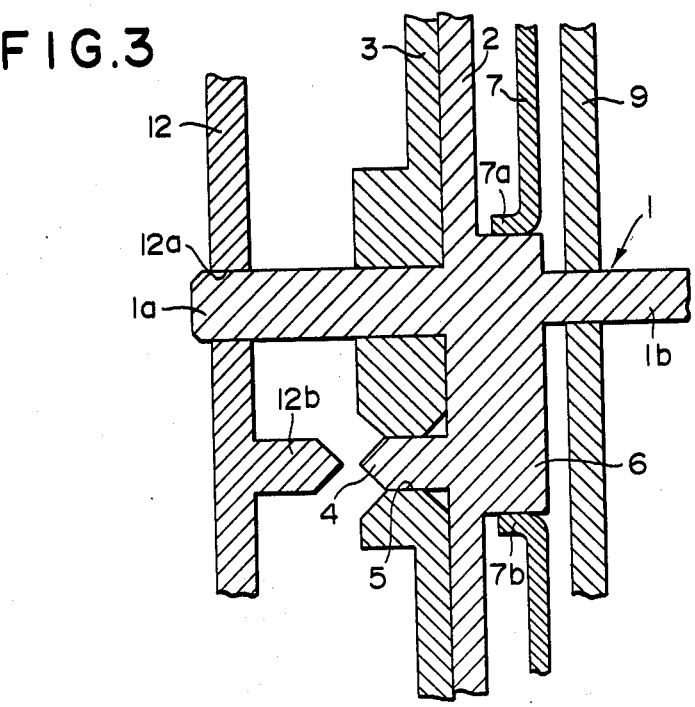
FIG. 3 is a side sectional view of the main portion of the shutter mechanism in accordance with the first embodiment of the invention wherein two sector blades are engaged with each other.

The first sector blade 2 has an engaging pin 4 and the second sector blade 3 has an engaging through-hole 5 so that the first and second sector blades 2 and 3 may be connected with each other and rotated together by the engagement of the engaging pin 4 and the engaging through-hole 5. FIGS. 1 and 3 show the state where the engaging pin 4 is engaged with the engaging through-hole 5.

The first sector blade 2 also has a cam 6 slidably sandwiched between two cam portions 7a and 7b of a film feeding claw plate 7, which is slidably mounted on a vertical guide bar 8, so that the film feeding claw plate 7 may be moved up and down sliding along the guide bar 8 by the rotation of the cam 6. The film feeding claw plate 7 has a claw 7c to fall in engagement with a perforation of a film to feed, the film by the downward movement thereof along the vertical guide bar 8. The vertical guide bar 8 extends along and fixed to a film gate plate 9 which has an exposure aperture 10. The film gate plate 9 also has a slot extending vertically which said claw 7c extends through and moves along.

The first and second sector blades 2 and 3 are rotated about the shaft 1 to open and close the exposure aperture 10.

Figure 2:
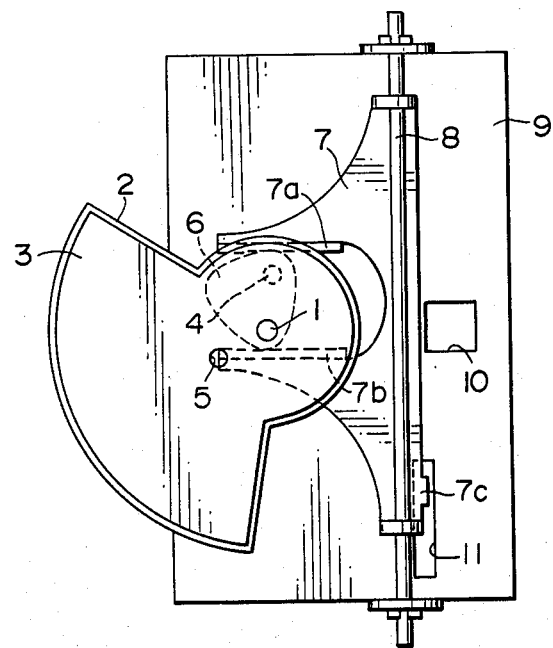
FIG. 2 is a front view of the shutter mechanism in accordance with the first embodiment of the present invention wherein the shutter blades are in the state to provide the larger open angle.
Figure 4:
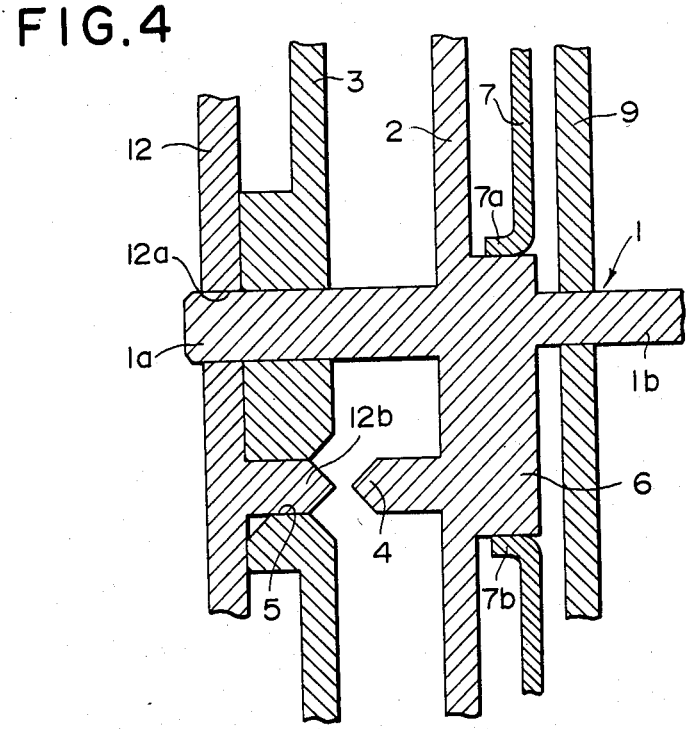
FIG. 4 is a side sectional view of the main portion of the shutter mechanism in accordance with the first embodiment of the invention wherein two sector blades are separated from each other.

As shown in FIGS. 3 and 4, the shaft 1 is integrally fixed to the first sector blade 2. The front part 1a of the shaft 1 extends through said second sector blade 3 and is rotatably supported in a support hole 12a of an end plate 12 which extends in parallel to the sector blades 2 and 3. The rear part 1b of the shaft 1 extends through said film gate plate 9 and is rotatably supported thereby, and the rear end of the shaft 1 is connected with a driving means (not shown). The end plate 12 has a projection 12b projecting toward the sector blades 2 and 3. The projection 12b is provided at a position to receive said engaging through-hole 5 of the second sector blade 3 when the second sector blade 3 is slid along the front part 1a of the shaft 1 to the front (to the left in FIGS. 3 and 4). The second sector blade 3 is made slidable to the front only when the second sector blade 3 is in the position to fully open the exposure aperture 10 as shown in FIGS. 1 and 2.

In operation of the above described shutter mechanism in accordance with this embodiment of the invention, when a narrow open angle is to be formed, the second sector blade 3 is slid along the shaft 1 to the rear and is connected with the first sector blade 2 by the engagement of the engaging pin 4 and the engaging through-hole 5 as shown in FIG. 3. When the engaging pin 4 is engaged with the through-hole 5, the second sector blade 3 is out of engagement with the projection 12b of the end plate 12, and is accordingly rotated together with the first sector blade 2. As shown in FIG. 1, when the second sector blade 3 is connected with the first sector blade 2, a narrow open angle is formed by the two sector blades 2 and 3.

When a large open angle is to be formed, the second sector blade 3 is slid along the shaft to the front and the engaging through-hole 5 thereof is disengaged from the engaging pin 4 of the first sector blade 2 and brought into engagement with the projection 12b of the end plate 12 as shown in FIG. 4. Thus, the second sector blade 3 is held in the position to fully open the exposure aperture 10 and only the first sector blade 2 is made rotatable to open and close the exposure aperture 10 as shown in FIG. 2. Since the open angle of the first sector blade 2 is larger than the open angle formed by the two sector blades 2 and 3, a longer exposure time can be obtained.

In the above described first embodiment, the open angle of the two sector blades 2 and 3 is about 240°, and the open angle formed by the two sector blades 2 and 3 as shown in FIG. 1 is about 120°. It will be understood, however, that said open angles may be freely selected to effect desirable two kinds of exposure time.

Figure 5:
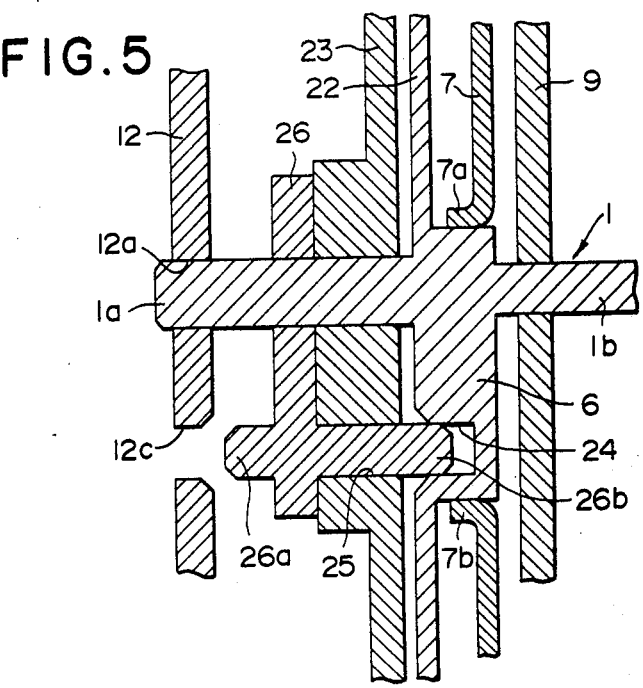
FIG. 5 is a side sectional view of the main portion of the shutter mechanism in accordance with a second embodiment of the invention wherein two sector blades are engaged with each other.
Figure 6:
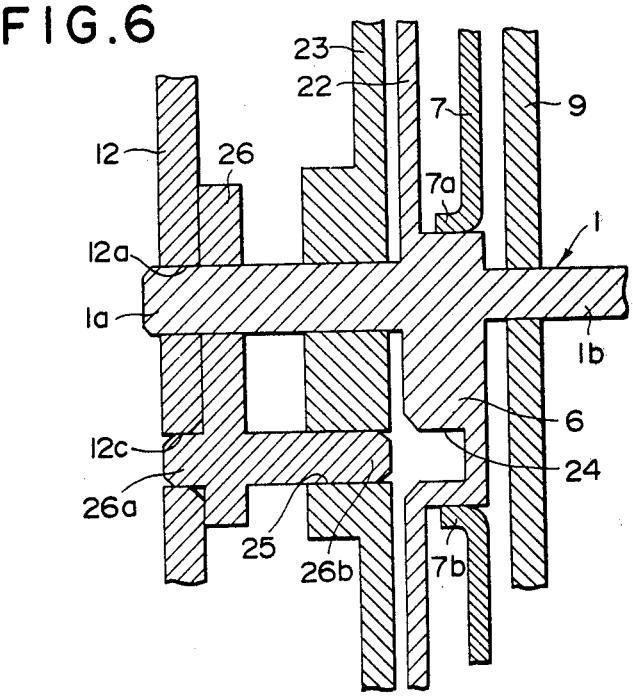
FIG. 6 is a side sectional view of the main portion of the shutter mechanism in accordance with the second embodiment of the invention wherein two sector blades are separated from each other.

A second embodiment of the present invention is illustrated in FIGS. 5 and 6 in which those elements equivalent to those employed in the first embodiment are indicated with the same reference numerals. In this embodiment, a first sector blade 22 is provided with an engaging hole 24 opened to the front and a second sector blade 23 is provided with an engaging through-hole 25. The engaging hole 24 of the first sector blade 22 and the engaging through-hole 25 of the second sector blade 23 are located at the same distance from the shaft 1 so that the two holes 24 and 25 may be registered. The two holes 24 and 25 are registered with each other only when the first and second sector blades 22 and 23 form a narrow angle thereby as the one shown in the first embodiment in FIG. 1. In this second embodiment, the second sector blade 23 is only rotatable about the shaft 1 but is not slidable therealong. The end plate 12 having a shaft support hole 12a to rotatably support the front part 1a of the shaft 1 is provided with another hole 12c. The hole 12c is apart from the shaft 1 by the distance same as the distance between the through-hole 25 of the second sector blade 23. Between the end plate 12 and the second sector blade 23 is provided an engaging slide plate 26 which has a front pin 26a to be inserted into said hole 12c of the end plate 12 and a rear pin 26b to be inserted into said through-hole 25 of the second sector blade 23 and the engaging hole 24 of the first sector blade 22. The engaging slide plate 26 is rotatably and axially slidably mounted on the shaft 1 and selectively put in two positions by a manually operable external operating means (not shown). In one position, as shown in FIG. 5, the engaging slide plate 26 is in the rear of its movement and the rear pin 26b is engaged with the engaging hole 24 of the first sector blade 22 extending through the through-hole 25 of the second sector blade 23 and disengaged from the hole 12c of the end plate 12. In the other position, as shown in FIG. 6, the engaging slide plate 26 is in the front end of its movement and the front pin 26a is engaged with the hole 12c of the end plate 12 and the rear pin 26b is disengaged from the engaging hole 24 of the first sector blade 22. Therefore, when the engaging slide plate 26 is in its front position, the second sector blade 23 is fixed to the end plate 12 and prevented from rotating together with the first sector blade 22. When the engaging slide plate 26 is in its rear position, the second sector blade 23 is connected with the first sector blade 22 and is rotated together therewith. Similarly to the first embodiment, when the second sector blade 23 is connected with the first sector blade 22, a narrow open angle is formed by the two blades 22 and 23 as shown in FIG. 1. When the second sector blade 23 is disengaged from the first sector blade 22 and fixed to the end plate 12, only the first sector blade 22 having a large open angle is rotated to open and close the exposure aperture with a long exposure time.

I claim:

1. A rotary shutter mechanism for a motion picture camera comprising a first sector blade having an open angle rotatable about an axis to open and close an exposure aperture of the camera, a second sector blade having an open angle rotatable about said axis to open and close the aperture, an end plate extending in parallel with and in front of said sector blades, pin-and-hole engaging mechanical means for connecting the second sector blade with the first sector blade to form an open angle thereby which is smaller than the open angle of the first sector blade so that both blades rotate together to effect a shorter exposure time, and pin-and-hole engaging mechanical means for separating the second sector blade from the first sector blade and connecting the second sector blade with the end plate to hold it stationary at a position where the second sector blade fully opens said aperture so that only the first sector blade opens and closes the aperture to effect a longer exposure time.

2. A rotary shutter mechanism for a motion picture camera as claimed in claim 1 wherein said second sector blade is made axially slidable and said means for connecting the second sector blade with the first sector blade comprises a projection formed on the first sector blade and a through-hole formed in the second sector blade to be engaged with the projection when the second sector blade is positioned at an end of its slidable movement, and said means for separating the second sector blade from the first sector blade and holding the second sector blade stationarily comprises the through-hole formed in the second sector blade and a projection stationarily provided in the camera to receive the through-hole to be engaged therewith when the second sector blade is positioned at the opposite end of its slidable movement.

3. A rotary shutter mechanism for a motion picture camera as claimed in claim 2 wherein said first sector blade is fixed to a shaft extending along said axis and said second sector blade is rotatably mounted on the shaft to be rotatable thereabout and slidable therealong.

4. A rotary shutter mechanism for a motion picture camera as claimed in claim 3 wherein said shaft is rotatably supported by said end plate extending in front of the sector blades and a film gate plate extending behind the sector blades, and said projection stationarily provided in the camera is a projection formed on the end plate.

5. A rotary shutter mechanism for a motion picture camera as claimed in claim 1 wherein said means for connecting the second sector blade with the first sector blade and separating the second sector blade from the first sector blade and holding the second sector blade stationarily comprises a fixed plate having a hole provided in the camera, an engaging hole formed in said first sector blade, a through-hole formed in said second sector blade, and a slidable member having a front pin to be inserted in the hole of said fixed plate and a rear pin to be inserted in the hole of said first sector blade through said through-hole of the second sector blade, said slidable member being selectively moved in a first position where the front pin is engaged with the hole of said fixed plate and the rear pin is engaged with the through-hole of the second sector blade but is disengaged from the hole of the first sector blade or a second position where the front pin is disengaged from the hole of the fixed plate and the rear pin is engaged with the hole of the first sector blade through the through-hole of the second sector blade.

6. A rotary shutter mechanism for a motion picture camera as claimed in claim 5 wherein said first sector blade is fixed to a shaft extending along said axis and said second sector blade is rotatably mounted on the shaft to be rotatable thereabout and said slidable member is slidably mounted on the shaft to be axially slidable therealong.

7. A rotary shutter mechanism for a motion picture camera as claimed in claim 6 wherein said shaft is rotatably supported by an end plate extending in front of the sector blades and a film gate plate extending behind the sector blades, and said fixed plate is the end plate.

* * * * *